United States Patent [19]

Ashley

[11] Patent Number: 5,218,507

[45] Date of Patent: Jun. 8, 1993

[54] OVERHEAD THREE-PHASE POWER LINE ELIMINATING FRINGING ELECTRIC AND MAGNETIC FIELDS

[76] Inventor: James R. Ashley, 2523 Lake Ellen La., Tampa, Fla. 33618

[21] Appl. No.: 578,215

[22] Filed: Sep. 6, 1990

[51] Int. Cl.⁵ .............................................. H02H 7/00
[52] U.S. Cl. ...................................... 361/107; 307/91; 174/36
[58] Field of Search ................ 174/36, 102 R, 40 CC, 174/73.1, 28; 307/91, 143, 147, 148, 326; 361/117, 107

[56] References Cited

U.S. PATENT DOCUMENTS

| | | | |
|---|---|---|---|
| Re. 17,235 | 3/1929 | Kirke et al. | 174/15 |
| 3,292,016 | 12/1966 | Kafka | 307/91 |
| 3,541,473 | 11/1970 | Schlicke | 174/102 R |
| 3,974,398 | 8/1976 | Othmer | 307/147 |
| 4,025,715 | 5/1977 | Foley et al. | 174/36 |
| 4,264,940 | 4/1981 | Castle | 361/56 |
| 4,371,742 | 2/1983 | Manly | 174/36 |
| 4,371,745 | 2/1983 | Sakashita | 174/36 |
| 4,575,691 | 3/1986 | Capek et al. | 361/119 |
| 5,053,910 | 10/1991 | Goldstein | 361/111 |

Primary Examiner—A. D. Pellinen
Assistant Examiner—Ronald W. Leja
Attorney, Agent, or Firm—David Kiewit

[57] ABSTRACT

Extraneous electric and magnetic fields, which may be public health risks associated with electric power transmission, are avoided by using an improved power transmission cable and wiring arrangement that uses coaxial transmission lines configured so that the return current flows in the outer conductor. A cable structure is taught that both provides the desired shielding and maintains protection against lightning strikes. The coaxial transmission lines eliminate radiation of 50–60 Hz electromagnetic waves.

5 Claims, 2 Drawing Sheets

OVERHEAD THREE-PHASE POWER LINE ELIMINATING FRINGING ELECTRIC AND MAGNETIC FIELDS

BACKGROUND OF THE INVENTION

Electrical power is distributed from central generating plants to homes, offices, and factories as three phase alternating current. It has long been realized that the choice of AC, rather than DC, allows the use of transformers that permit power to be distributed at higher voltages than the voltage at which it is ultimately used. This practice reduces the current in the distribution system and thereby maximizes distribution efficiency by minimizing losses. The frequency of 50 Hz to 60 Hz was chosen as a compromise for wavelength along transmission lines and the size of laminated ferromagnetic core transformers which attain maximum efficiencies well above 90% at 50–60 Hz. To further improve efficiency, and to make high starting torque AC motors simpler to engineer, the power transmission system is three phase.

In recent years there has been an increasing public concern about possible biological effects of the low frequency electrical and magnetic fields associated with the distribution and use of electrical power. One can find, for example, a conjectural review of possible phenomenological bases for such hazards as well as a discussion of a number of recent epidemiological studies in an article by Karen Fitzgerald, et. al, that was published in the August, 1990, issue of the *IEEE Spectrum* (ISSN 0018-9235). Although the evidence in this area is far from being unequivocally persuasive, the level of public concern has led to litigation aimed at preventing the construction of power transmission lines. The State of Florida has a guideline limiting both electric field strength and magnetic intensity at edge of right of way for new powerlines, Florida Administrative Code Chapter 17-274.

Measurement of both electric field strength and magnetic intensity is made in accordance with ANSI 644-1987 *IEEE Standard Procedures for Measurement of Power Frequency Electric and Magnetic Fields from AC Power Lines*

In discussing the public health issues related to power lines, it is convenient to consider three classes of power lines:

1) Urban distribution lines running from a substation to distribution transformers located near the point of use, and commonly operated at 10 to 25 kV.
2) Urban transmission lines that supply power to the substations and that are usually not isolated on rights of way and commonly operated at 69 to 138 kV.
3) Rural transmission lines on rights of way and that are commonly operated at voltages above 115 kV.

Although much of the most recent public outcry has been at the third category of power transmission lines listed above, the 10–25 kV category may be more significant because of the vastly greater number of people exposed. Distribution lines in the 10–25 kV category, if mounted on poles, can give rise to measured electrical fields of as much as 20 V/m, and magnetic fields as high as 1.3 micro-tesla when measured on the ground below the lines.

A typical three-phase distribution circuit is four wire, wye connected. A neutral conductor is found in both overhead and buried distribution powerlines. The neutral is used for carrying the unbalanced current as well as for safety purposes. In a dense urban area, the three phase distribution circuit will have on the order of one hundred single phase distribution transformers. These are often connected from phase conductor to neutral. About one third of the total number of transformers is connected to each phase conductor with the object of balancing the load between the three phases and thereby minimizing neutral current. It is well know in the theory of three-phase systems that a balanced load, i.e., a load that has equal current magnitudes and power factor angles for each phase, has zero current in the neutral.

The issue of stray fields from 10–25 kV lines has a well known solution - underground utilities. Both theory and measurements show that placing all three phase conductors in a common steel conduit provides nearly perfect magnetic and electrostatic shielding. There are also aesthetic advantages to underground utilities, which has led to their widespread use in new construction. A major question in the controversy over possible health risks from stray fields is whether or not to rebuild method of reducing or eliminating fringing fields while using the existing wooden poles could provide an economically attractive alternative method of resolving the problem.

In many larger cities in the United States, the second level of electrical distribution is served by 69 kV to 138 kV lines on wooden or steel poles that are located along streets rather than being on dedicated rights of way. It is common to measure electrical fields of over 100 V/M in the front yards of homes that are adjacent to such lines. The magnetic fields associated with these lines, however, are usually lower than those from the lower voltage 10–15 kV distribution lines that are commonly mounted below the 69–138 kV circuit on the same poles.

The intermediate distribution system of category 2 may pose a serious electric field problem. Theoretically, burying the three phase conductors in a common steel conduit, which is commonly used for the 10–25 kV lines, will work at any voltage level, and will eliminate stray electrical fields. If the same wiring geometry is used for these lines as is employed for the 10–25 kV lines, burial will also eliminate stray magnetic fields. Putting all three conductors in a common steel conduit unfortunately poses other problems, partly caused by the difficulty of providing adequate phase-to-phase dielectric insulation at the higher voltages. In addition to the insulation question, the added line capacitance associated with this construction could lead to transmission inefficiencies because of the leading power factor. If, on the other hand, the three phase conductors are buried in separate conduits and the common neutral wye connection is used for the transformers at either end of the line, fringing magnetic fields are not eliminated. In fact, since people walking above the buried line are closer than they would be to a comparable overhead power line, exposure to magnetic fringing fields could be more severe for the underground line.

At larger substations, power from generating plants is supplied at 230 kV or higher. These lines are usually constructed on dedicated rights of way that are typically 60 meters (about 200 ft) wide. For remote power plants and interconnection with other utilities, the powerlines are operated at 345 kV, 500 kV, and 765 kV. These high capacity powerlines are large with steel towers, long insulators, and bundles of conductors.

Fortunately, the electrical and magnetic fields from these lines diminish rapidly in strength the further one goes away from the lines and the number of people who live within 200 m of these power lines is small; thus, this category 3 is not as significant a potential public health risk as the other two categories.

One can show from basic physical theory that the strength of electrical and magnetic fields varies dramatically with distance from the two parallel conductors that are commonly used for power distribution. (Magnetic intensity falls inversely with the square of distance.) Near the conductors, the electric and magnetic fields are intense, but once one moves further away from the line than 5 times the conductor-to-conductor spacing, the fields are weak. Although fringing fields can be reduced by close conductor spacing other factors, such as the dielectric strength required to prevent arcing between phase lines, limits the degree of closeness.

The high level of both magnetic fields and electric fields relatively close to the open wire transmission lines is the cause of an occupational health issue related to three phase overhead power lines. Maintenance workers such as tree trimmers receive a significant exposure dose for both electric and magnetic fields, even when working near the 10-25 kV distribution powerlines.

As a practical example, one can consider the significant difference of the fringing magnetic field measured near two types of 120/240 "service drops". In installations made before about 1950, all three wires running from the utility pole to a house were supported on individual insulators. Conductor separation was of the order of 30 cm. As insulating material became more weather resistant, this construction was replaced by a single cable consisting of a support wire and the two "hot" wires which were wrapped around the support wire in a spiral fashion. In this newer design, conductor separation was reduced to about 3 cm. This reduction of conductor-to-conductor spacing reduces fringing fields measured on the ground under the service drop to about 1/10 of the the value for the old wiring technique.

The foregoing discussion is directed toward transmission lines made of several parallel conductors. Another widely used transmission line design is "coaxial", which is widely used when shielding is important. Because of the lower leakage fields at VHF, for example, coaxial cable is replacing parallel line "twin lead" for TV and VCR interconnection and for distribution of cable TV signals. Electrostatic theory indicates that this configuration should have no external electric field. Transmission line theory also shows that there is no magnetic field outside the transmission line if the return current flows in the outer conductor; but, that there is an external magnetic field if some other return path is used. Hence, coaxial cabling offers a wa to eliminate fringing electric and magnetic fields under some circumstances.

It is important to note that if one makes a simple and straightforward substitution of coaxial cabling into a conventional power transmission system, the fringing magnetic fields are not eliminated. For three phase power lines, for example, separate coaxial lines would not eliminate fringing magnetic fields because the return current in any outer conductor would not necessarily be equal and opposite to the source current in the associated central conductor. Some reduction in magnetic fields caused by return current shielding would be expected. In addition, with the elimination of "arcing" between conductors caused by line to line voltage, separate coaxial cables could be located very close together and therefore markedly reduce the fringing fields. It should be noted that all of the coaxial cable methods would eliminate fringing electric fields.

This defines the problem to be solved by my invention: Eliminate the fringing magnetic fields as well as the electric fields of a three phase power transmission line.

OBJECTS OF THE INVENTION

It is an object of the invention to provide apparatus for alternating current electrical power transmission that prevents electrical and magnetic fields at both the fundamental and higher harmonic frequencies from extending outside of the transmission medium.

It is a further object of the invention to provide apparatus for electrical power transmission that substantially eliminates whatever public health risks may be caused by exposure to fringing electrical and magnetic fields associated with prior art transmission apparatus.

It is a further object of the invention to provide apparatus for electrical power transmission that substantially eliminates whatever occupational health risks may be caused by worker exposure to electrical and magnetic fields associated with prior art transmission apparatus.

It is a further object of the invention to provide apparatus which may be introduced in the existing three phase electrical power distribution system.

It is a further object of the invention to provide apparatus which is as immune to lightning damage as prior art apparatus.

It is a further object of the invention to provide apparatus convenient to install.

It is a further object of the invention to provide apparatus with a continuous safety ground.

It is a further object of the invention to provide apparatus for electrical power transmission that substantially reduces the hazard of accidental contact through such hazardous actions as flying kites, moving metallic ladders or TV masts, near the apparatus.

It is a further object of the invention to provide apparatus for electrical power transmission that is less hazardous than the prior art in the unlikely event that the overhead cables or wires fall.

It is a further object of the invention to provide a lower cost means of reducing or eliminating potential public health risks caused by fringing magnetic fields than is offered by the known expedient of burying urban electrical distribution cabling.

It is a further object of the invention to eliminate radiation of 50-60 Hz. electromagnetic waves.

It is yet a further object of the invention to reduce eddy current losses in underground electrical distribution systems.

DETAILED DESCRIPTION

In discussing the background of the invention, it was mentioned coaxial cable provides ideal shielding of the fringing electric field and magnetic fields only if the return current flows in the outer conductor. The most straightforward method of connecting coaxial cables for power distribution is ineffective at shielding the fringing magnetic field because the return current does not flow in the outer conductor. This difficulty can be remedied, and the basic transmission line problem solved by reconnecting the wiring system of a three phase AC electric power system so that all return current flows in the outer conductors.

Figure 1:
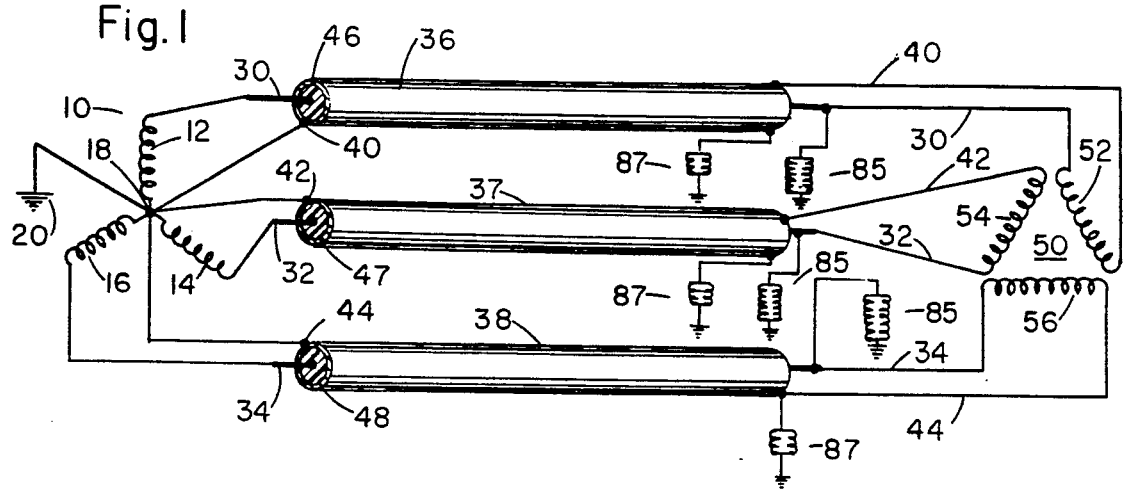
FIG. 1 of the drawing shows the coaxial wiring arrangement of the invention connecting a three phase AC source transformer to a three phase load transformer.

Turning now to FIG. 1 of the drawing, one finds a three phase source transformer 10 that is wye connected with secondary windings 12, 14, and 16 and with common point 18. The primary windings of the transformer 10 are not relevant to the discussion of the invention, and have been omitted from the drawing for convenience in illustration. The common point 18 is connected to the distribution system ground 20. Secondary windings 12, 14, and 16 of the transformer 10 are connected to the center conductors 30, 32 and 34 of the three coaxial transmission lines 36, 37, and 38. The center conductors 30, 32 and 34 are isolated from the three outer conductors 40. 42 and 44 by dielectric media 46, 47 and 48. The three outer conductors 40, 42, and 44 are connected to the source common point 18 and thus to ground at ground point 20.

At the distal end of transmission lines 36, 37 and 38, the center and outer conductors are connected to a three phase load transformer 50, which has three primary windings 52, 54 and 56. Details of the secondary windings of this transformer are not important to this discussion and these secondary windings have therefore been omitted from the drawing in the interest of clarity. Note that load 50 does not have the ends of the windings tied together at common points as one would expect for a delta or wye connected device. Note also that there is no ground on the primary side of the distal load 50.

The wiring arrangement described above attaches a three phase source 10 to a three phase load 50 while ensuring that all three transmission lines 36, 37, and 38 have the current in their center conductors 30, 32 and 34 precisely matched by the return current in their outer conductors 40, 42 and 44. This balancing of outgoing and return current in a coaxial conductor ensures that there will be neither an electric potential gradient nor a magnetic intensity outside of the transmission lines—i.e the fringing fields are eliminated both very close to the cable and remote from the cable.

Figure 2:
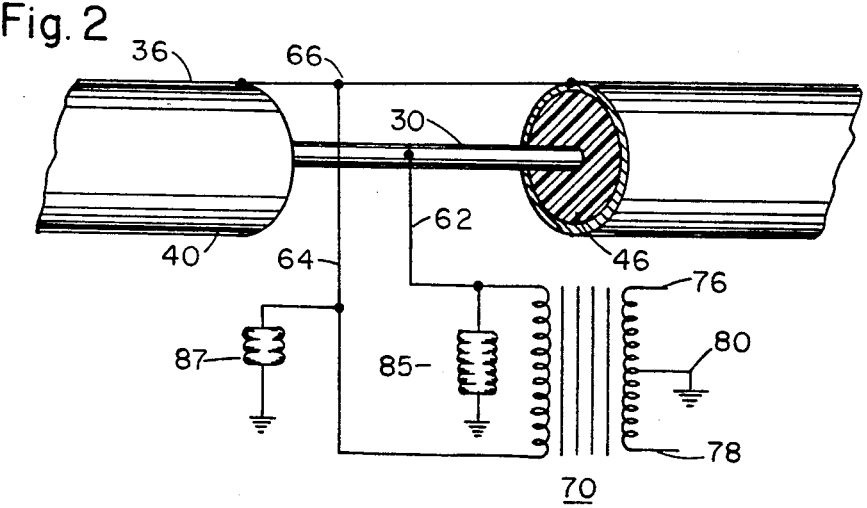
FIG. 2 of the drawing shows how a single phase load is to be connected to the coaxial wiring arrangement of the invention.

The arrangement of attaching single phase loads so as to eliminate fringing electric and magnetic fringing fields may be understood by reference to FIG. 2 of the drawing where the transmission line 36 is illustrated with a section of outer conductor 40 and dielectric 46 cut away so as to expose center conductor 30. A lead 62 to one side of the primary windings of single phase load transformer 70 is attached to center conductor 30, while the other transformer lead 64 is attached to a wire 66 that bridges the section where the outer conductor 40 has been removed. The single phase load 70 in this example is shown as a transformer with output leads 76, 78, and 80 where center tap 80 is grounded for safety reasons. It will be understood by those skilled in the art of making coaxial cable connections that other equivalent means of attaching leads and bridging the outer conductor 40 may be employed for the same purpose.

For each single phase load, as illustrated above, the return current in the outer conductor of a coaxial transmission line will be equal and opposite to the outgoing current in the center conductor of the line. That is, in the single phase case, just as in the three phase case, the currents in the two conductors of a coaxial transmission line are balanced and both the electric and magnetic fringing fields are thereby eliminated.

Additional single phase loads may be connected in the manner shown in FIG. 2 of the drawing to the cables 37 and 38. The manner of selecting the appropriate cable 36, 37, or 38 to best balance the distribution system is well known in the prior art.

The disclosed wiring apparatus reduces electric potential gradient and magnetic flux density close to the power transmission cables so as to greatly reduce the occupational health risk of maintenance workers as compared to prior art.

In addition to the elimination of fringing fields, the disclosed coaxial wiring arrangement offers several other advantages:

1) The magnetizing current for each transformer is primarily a third harmonic of the power line frequency (i.e. 180 Hz for a 60 Hz line). In a traditional three phase system the 3rd and 9th harmonics in the magnetizing current would add in the common neutral. In the disclosed coaxial arrangement, the magnetizing current flows in a coaxial cable and the fields are contained therein.

2) If the disclosed coaxial wiring arrangement is used in underground service (i.e where all three transmission lines are buried in a common steel conduit) no magnetic field cuts the conduit. Hence, there are no eddy current losses. In the conventional power transmission arrangement, the intense magnetic field adjacent to the conductors cuts the conduit and produces eddy current losses.

It should be noted that the capacitance per unit length of transmission line is greater for the disclosed coaxial transmission line than it is for conventional open parallel line construction. This will cause a leading power factor that will reduce system efficiency if not offset. If the loads that are being supplied by the system include large numbers of fluorescent lights and induction motors, both of which operate with lagging power factors that would offset the leading power factor of the transmission line, the use of the coaxial transmission system may prove to be more efficient. In other cases, the new approach may be less efficient.

Neither the three phase nor the single phase load examples illustrated in FIGS. 1 and 2 of the drawing provide for safety grounds on the primary side of a load. The only ground allowed on the disclosed wiring arrangement is at the source transformer ground connection point 20. This design constraint is adopted in order to maintain the return current in the outer conductor equal to the source current in the center conductor, as is necessary for the elimination of fringing magnetic fields. This absence of ground connections remote from the source poses a risk with respect to lightning that can be overcome, as will now be shown.

One method of overcoming lightning hazards in the disclosed system is the use of surge arrestors, which are devices that act as insulators when a normal transmission system voltage is applied, but that rapidly become conductive when a substantial overvoltage (e.g. a lightning strike) appears on the line. A high voltage surge arrestor (e.g. shown as 85 in FIGS. 1 and 2), can be connected from each transmission line center conductor to ground, and a lower voltage surge arrestor (e.g. shown as 87 in FIGS. 1 and 2) can be connected from each outer conductor to ground. Tests, which have yet to be conducted, may indicate that adequate lightning protection can be obtained at lower cost by connecting appropriate surge protection devices to only the outer conductors of the disclosed coaxial transmission line.

Figure 3:
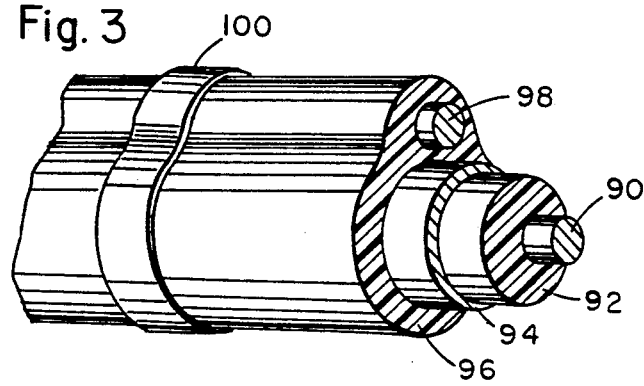
FIG. 3 of the drawing illustrates a preferred configuration for a composite cable embodying the principles of the invention.

Lightning hazards in the disclosed system can also be addressed by the use of the composite cable construction that is illustrated in FIG. 3 of the drawing. This illustration shows a coaxial cable consisting of center conductor 90, surrounded by dielectric medium 92 that is in turn surrounded by a coaxial outer conductor 94. A second dielectric 96 surrounds both the outer conductor coaxial 94 and a support and ground cable 98. Metal bands, generally shown by one drawn example 100 may be used at intervals along the composite cable to further secure the support and ground cable 98 to the balance of the composite structure.

Figure 4:
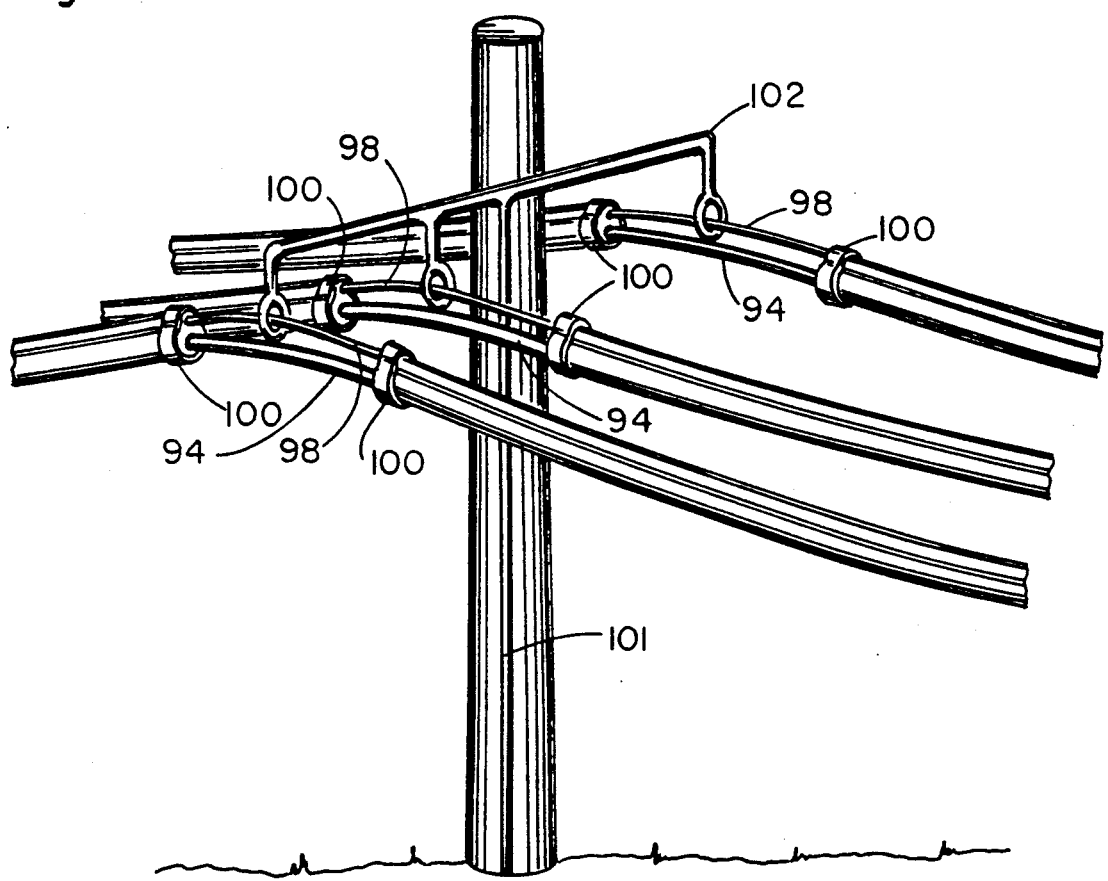
FIG. 4 illustrates a manner in which the support cable of the composite cable of FIG. 3 may be utilized for mounting and for providing a ground for lightning protection.

This composite cable construction allows cable installers to cut through the outer dielectric 96 wherever the cable passes a pole to expose the support and ground cable 98, as shown in FIG. 4. Ground connections 101 can then be made to the support and ground cable 98 as shown in FIG. 4 to provide a lightning safety ground for the cable. The ground and support cable 98 can also be used to support the composite cable at a pole by removing several of the metal support bands 100 near a pole, slitting the composite cable parallel to the coaxial cable axis so as to separate the support and ground cable 98, and then inserting a support arm or clamp 102 into the slit, thereby clamping the composite cable to the pole or other support member.

The complete dielectric covering of the disclosed cable reduces the hazard of accidental contact by metallic ladders, TV masts, kites, and the like.

The disclosed coaxial wiring arrangement can be installed as described herein to replace a distribution circuit having only overhead three phase power transmission lines without changing the specification of transformers in the substation or the specifications of the single phase transformers at the point of use.

The disclosed coaxial wiring arrangement can also be installed to replace a distribution circuit having overhead three phase power transmission lines to supply buried three phase power transmission lines by using 1 to 1 transformers to isolate the safety grounds of the buried portion of the circuit from the replaced overhead portion of the circuit.

The disclosed coaxial wiring arrangement eliminates radiation of 50–60 Hz electromagnetic waves.

Although the present invention has been described with respect to a preferred embodiment and several minor modifications thereof, many alterations and modifications may be made without departing from the invention. Accordingly, it is intended that all such alterations and modifications be considered as within the spirit and scope of the invention as defined in the appended claims.

I claim:

1. Apparatus for distributing three-phase alternating current electrical power, each phase respectively provided by one of three secondary windings of a three-phase wye-connected source transformer, to a three-phase load transformer having three primary windings, each corresponding to a secondary winding of said three-phase source transformer, and to a single phase load transformer having a single primary winding, comprising three coaxial cables, each having
a first end adjacent said source transformer,
a center conductor and a coaxially formed outer conductor, and
a second end adjacent said three-phase load transformer, means for respectively coupling said inner and outer conductors across said secondary windings at said first ends, means for electrically connecting said outer conductors to a common grounded neutral point at said first ends, means for respectively coupling said inner and outer conductors across said primary windings of said three-phase load transformer at said second ends, and means for coupling said primary winding of said single phase transformer across a said inner and a said outer conductor of a said coaxial cable without making an electrical ground connection at said primary winding of said single phase transformer.

2. Apparatus of claim 1 further comprising
a first triad of lightning arrestors each said
arrestor of said first triad having a first operating voltage, each said lightning arrestor of said first triad being connected between a said coaxially formed outer conductor of one of said cables and ground at a point proximal to said three-phase load, and a second triad of lightning arrestors each said
arrestor of said second triad having a second operating voltage higher than said first operating voltage, each said lightning arrestor of said second triad being connected between a said center conductor of one of said cables and ground at a point proximal to said three-phase load.

3. Apparatus for use in overhead distribution of three-phase alternating current electric power, each phase respectively provided by one of three secondary windings of a three-phase wye-connected source transformer, to a three-phase load transformer having three primary windings, each corresponding to a secondary winding of said three-phase source transformer, and to a single phase load transformer having a single primary winding, comprising three coaxial cables, each having
a first end adjacent said source transformer,
a center conductor and a coaxially formed outer conductor,
a second end adjacent said three-phase load transformer, and
a metallic support cable external to and electrically isolated from said coaxially formed outer conductor, means for respectively coupling said inner and outer conductors across said secondary windings at said first ends, means for electrically connecting said outer conductors to a common neutral point at said first ends, means for respectively coupling said inner and outer conductors across said primary windings of said three-phase load transformer at said second ends, means for coupling said primary winding of said single phase transformer across a said inner and a said outer conductor of a said coaxial cable without making an electrical ground connection at said primary winding of said single phase transformer, and means for electrically connecting said support cable to an electrical ground at a point remote from said source transformer.

4. Apparatus for reducing fringing electrical and magnetic fields associated with the distribution of three-phase alternating current electric power comprising three coaxial cables, each of said cables having a first end at a wye-connected source transformer and a second end at a three-phase load, each said cable including a center conductor and a coaxially formed outer metallic conductor, wherein each said coaxially formed outer metallic conductor is electrically connected to a common grounded neutral point proximal to said source transformer, each phase of said three phase load is coupled between two conductors of one of said three coaxial cables, and a single phase load is coupled between a said center conductor of a said cable and said coaxially formed metallic outer conductor of said a said cable.

5. Apparatus for reducing fringing electrical and magnetic fields associated with the distribution of three-phase alternating current electric power comprising three cables, each of said cables having a first end at a source transformer and a second end at a three-phase load, each said cable including a center conductor, a coaxially formed outer metallic conductor, and a metallic support cable adjacent to and electrically isolated from said coaxially formed outer metallic conductor, wherein each said coaxially formed outer metallic conductor is electrically connected to a common neutral point proximal to said source transformer, wherein each phase of said three phase load is coupled between two conductors of one of said three coaxial cables and wherein each said support cable is attached to an electrical ground at a point remote from said source transformer.

* * * * *